United States Patent
Eybert-Berard et al.

[11] Patent Number: 6,072,684
[45] Date of Patent: Jun. 6, 2000

[54] DEVICE AND METHOD FOR PROTECTING A SITE AGAINST THE DIRECT IMPACT OF LIGHTNING

[75] Inventors: André Eybert-Berard, Sassenage; Jean-Pierre Berlandis, Crolles; Michel Clement, Meylan, all of France

[73] Assignee: Commissariat a l'Energie Atomique, Paris, France

[21] Appl. No.: 09/214,262

[22] PCT Filed: Jul. 3, 1997

[86] PCT No.: PCT/FR97/01192

§ 371 Date: Mar. 4, 1999

§ 102(e) Date: Mar. 4, 1999

[87] PCT Pub. No.: WO98/01929

PCT Pub. Date: Jan. 15, 1998

[30] Foreign Application Priority Data

Jul. 5, 1996 [FR] France .................................. 96 08421

[51] Int. Cl.[7] ...................................................... H01H 3/22
[52] U.S. Cl. ............................................ 361/212; 361/213
[58] Field of Search .................................. 361/212–219, 361/220

[56] References Cited

U.S. PATENT DOCUMENTS 4,017,767  4/1977  Ball .......................................... 307/149
5,175,664  12/1992  Diels et al. ............................... 361/213
5,726,855  3/1998  Mourou et al. .......................... 361/213

FOREIGN PATENT DOCUMENTS

| 0 320 358 | 6/1989 | European Pat. Off. . |
| 2 528 584 | 12/1983 | France . |
| 403222295A | 10/1991 | Japan . |
| 403222296A | 10/1991 | Japan . |
| 403222297A | 10/1991 | Japan . |
| 4-160799 | 6/1992 | Japan . |
| 404160799A | 6/1992 | Japan . |
| 405041289A | 2/1993 | Japan . |
| 405067498A | 3/1993 | Japan . |
| 405180954A | 7/1993 | Japan . |
| 407029693A | 1/1995 | Japan . |
| 407122394A | 5/1995 | Japan . |
| 2 206 005 | 12/1988 | United Kingdom . |

OTHER PUBLICATIONS

Patent Abstracts of Japan, vol. 17, No. 334 (E–1387), Jun. 24, 1993, JP 05 041289, Feb. 19, 1993.

*Primary Examiner*—Fritz Fleming
*Attorney, Agent, or Firm*—Oblon, Spivak, McClelland, Maier & Neustadt, P.C.

[57] ABSTRACT

A device and method for protecting a site against lightning strikes. The device detects the approach of a lightning discharge towards the site. In response, the device forms an ionized channel in the vicinity of the site to direct the electrical lightning discharge towards a lightning conductor.

17 Claims, 2 Drawing Sheets

DEVICE AND METHOD FOR PROTECTING A SITE AGAINST THE DIRECT IMPACT OF LIGHTNING

BACKGROUND OF THE INVENTION

1. Field of the Invention

The invention relates to a device and process for the protection of a site against lightning strikes.

It is particularly applicable to protection of buildings and sensitive sites such as storage sites, military sites, strategic antenna areas, petrochemical complexes, laboratories, pyrotechnic plants, and nuclear power stations.

2. Discussion of the Background

Protection against lightning strikes usually makes use of two devices that have been known for a long time, namely lightning arresters and a metal meshed cage. The efficiency of the lightning arrester, which channels the electrical discharge of the lightning away from a given point, is debatable. Furthermore, the protection radius of a lightning arrester is usually limited.

This is also the case for the meshed cage which, like a Faraday cage, must fully surround the site to be protected and therefore can only be used for a single building.

Furthermore, it is observed that a meshed cage is used especially to provide protection against electromagnetic aggression which is an indirect effect of a lightning strike.

Document FR-A-2 528 584 also describes a storm detection device. The device described in this document makes use of the difference in the electric field on the ground during fine weather and under stormy conditions to detect and signal when a storm is imminent. However, the device cannot detect a lightning strike or predict its effects.

Documents EP-A-320 358 and JP-A-04 160 799 describe these devices that protect a site against lightning strikes or artificially provoke a discharge.

SUMMARY OF THE INVENTION

A first purpose of this invention is to propose a protection device and a process providing protection against lightning strikes that can provide efficient protection over a large site.

Another purpose of the invention is to protect the site not only against the direct effects of lightning related to the strike, but also against indirect effects related to electromagnetic radiation.

Finally, one purpose of the invention is to propose a device capable of reinforcing the action of a conventional lightning arrester and to complement the action of the mesh cage.

Another purpose of the invention in order to achieve the objectives mentioned above, is a process for providing protection of a site against lightning strikes, characterized in that at least one ionized channel is formed in the air in the vicinity of the said site, to direct the lightning towards a lightning conductor.

In the meaning of the invention, a protected site is a site for which the characteristic dimensions are between a few tens of meters and several hundreds of meters.

Furthermore, it is considered that the ionized channel is formed in the vicinity of the site when it is at a distance of between a few tens of meters and a few hundreds of meters or even a few kilometers, from the site. The distance between the channel and the site is advantageously adjusted to suit the degree of protection and the required type of protection. When the ionized channel is close to the site, the site is well protected from direct lightning strikes. Conversely, an ionized channel further away provides better protection against indirect electromagnetic effects.

For example, this type of site may include a number of buildings or different equipment to be protected.

For example, the ionized channel may be created by a laser triggered in response to the detection and variation of an electric field on the ground, which is a precursor to the electrical lightning discharge. Due to the ionized channel, the electric lightning discharge follows the preferred path along the ionized air to join the lightning conductor provided for it.

In this respect, note that the electrical discharge corresponding to lightning usually originates in a cloud, for example a cumulo-nimbus cloud, and propagates towards the ground at an average speed of the order of $10^5 \text{m.s}^{-1}$. This discharge originating in the cloud will be referred to throughout the rest of the text as the "leader". An upwards discharge called the upwards precursor occurs before the leader intercepts the ground. The upwards precursor starts either directly from the ground or from a prominence above it. With the equipment according to the invention, the upwards precursor appears at the focal point of the ionized channel formed by the laser.

Finally, the main discharge takes place when the leader discharge and the upwards discharge meet.

The movement towards the ground of the leader discharge which precedes the main discharge, can be recognized by the accompanying fast variation with time of the electric field close to the ground.

This modification of the electric field on the ground is used within the invention to trigger a laser capable of ionizing air.

Another objective of the invention is a device for protection of a site against lightning strikes. This device according to the invention comprises a means for detecting the approach of a lightning discharge towards the site, a lightning conductor, and a means for forming an ionized channel in the air close to the site. To direct the electrical lightning discharge towards the lightning conductor, the forming means is controlled by the detection means. The ionized channel has an ionization density greater than or equal to a value of the electrification ionization density. The ionization density of the channel is the number of free electrons per unit volume. As a result, the ionized channel is electrically conducting. The ionized channel only becomes electrically conducting when the ionization density is greater than or equal to the electrification density; starting from which a stable electrical current may be set up in the channel. It is assumed that the electrification ionization density is of the order of $5.10^{11}$ $e^-/cm^3$. Thus, the ionization density of the channel is chosen to be greater than or equal to $5.10^{11}$ $e^-/cm^3$, and preferably, for example, of the order of $10^{13}$ $e^-/cm^3$.

Advantageously, the lighting conductor may be placed outside the site to be protected. For example, its distance from the site may be between a few tens of meters and few kilometers.

When this measure is used the site may be protected both from the direct effects of the strike and at least par of the indirect effects related to electromagnetic radiation of the lightning.

Note that if the buildings on the protected site include installation very sensitive to electromagnetic radiation, the device according to the invention may be used together with a meshed cage surrounding the sensitive devices.

According to another aspect of the invention, the means of detecting the approach of a discharge may comprise one or several electric field sensors placed in a region including the site to be protected, in other words on the site itself or close to the site. For example, field sensors may be capacitive antennas or electric field mills.

For example, sensors may be capable of measuring the electric field on the ground, and its variations with time. A measurement on the ground means a measurement made in the immediate vicinity of the ground, at a short distance from the ground or possibly on a building or on equipment provided for this purpose.

In one particular embodiment of the device, means of detecting the approach of a discharge also comprise a signal acquisition and processing unit connected to electric field sensors to receive electric field detection signals on the ground, and connected to the means of forming an ionized channel to trigger the formation of the ionized channel.

A threshold in the electric field and/or a threshold in the variation of the electric field with time is defined, above which it may be concluded that a lightning leader is approaching.

Thus, the signal acquisition and processing control unit may include a control system capable of forming an ionized channel trigger system when the variation in the electric field per unit time exceeds a predetermined variation value.

According to one alternative embodiment, the control system may be designed to form the trigger signal when the field variation exceeds the predetermined value and the electric field also exceeds a predetermined value.

For example, the value of the predetermined field is about 20 kV/m and the value of the variation of the predetermined field is 1 kV/m/ms.

According to one advantageous aspect of the invention, the means of forming an ionized channel comprise a laser. The power of the laser may be chosen as a function of the required channel length and the required ionization density. The length of a channel is usually chosen to be about 150 m. For example, the laser may be a U.V. type laser, or an excimer or YAG laser with a wave length between 200 and 400 nm. The laser is preferably pulsed (from 10 to 20 ns) at a frequency of the order of 250 Hz or more. The power is chosen to be of the order of 1 to 2 MW.

Other characteristics and advantages of the invention will become clearer after reading the following description with reference to the figures in the attached drawings, which are given for illustrative purposes and are in no way restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
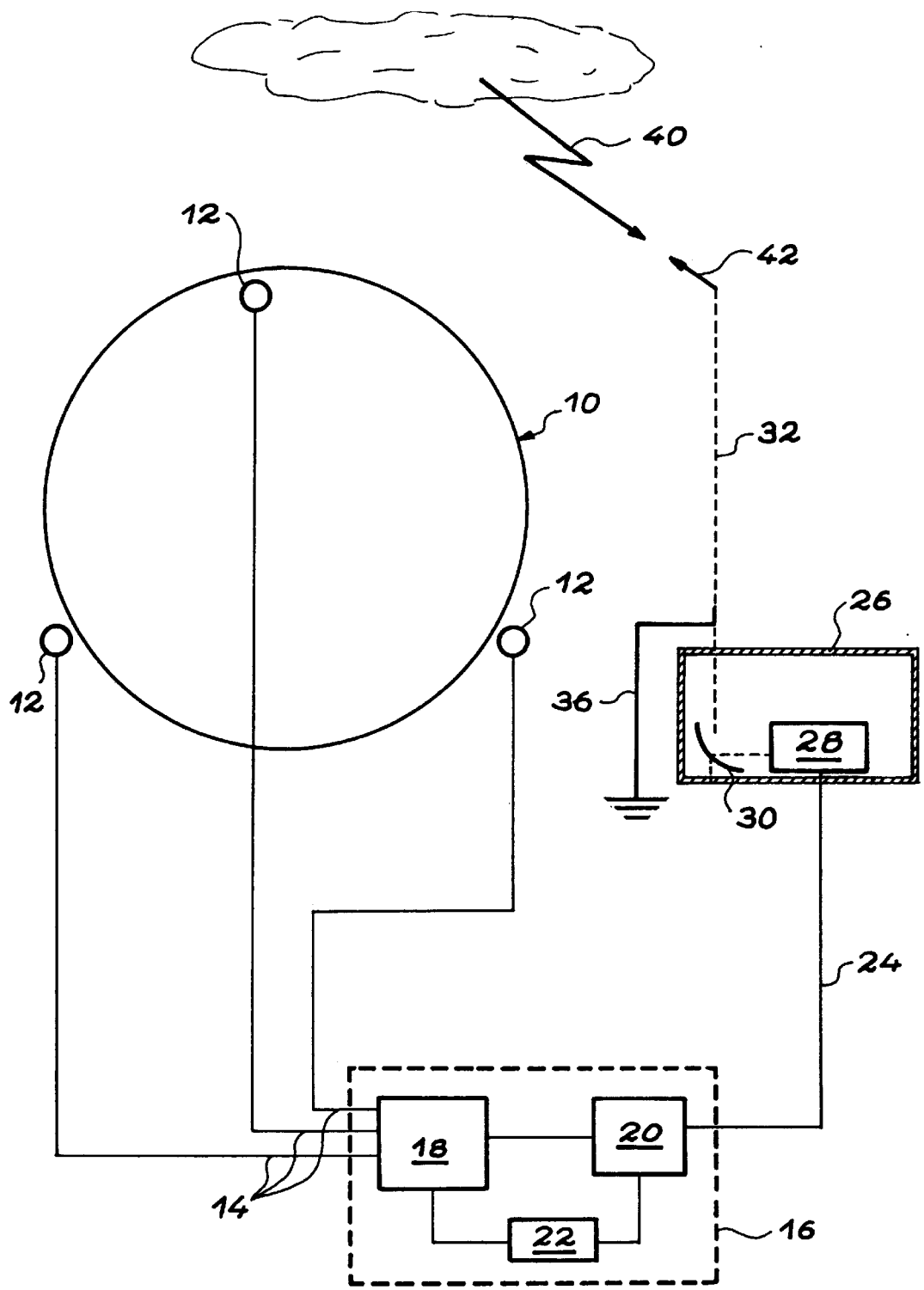
FIG. 1 is a block diagram of a device conform with the invention providing protection for a site against lightning strikes.

Reference 10 in FIG. 1 shows a site to be protected. For example, it may be a petrochemical site that is to be protected from direct lightning strikes and electromagnetic disturbances that may be generated by strikes.

Three capacitive antennas 12 are installed around the periphery of the site 10, which forms means of detecting the approach of a lightning discharge and more precisely the approach of a leader discharge.

These antennas may also be positioned on the same site. The capacitive antennas are of the high resolution type (sub-microseconds) and operate with a field detection range varying approximately from 0 to 150 kV/m. The three antennas 12 are distributed on the site and installed particularly in the vicinity of buildings containing sensitive equipment.

Optical links 14, for example optical fiber links, connect the capacitive antennas 12 to a signal acquisition and processing control unit 16. The choice of data transmission by optical fiber, in other words by an electrically insulating link, can give a high quality galvanic insulation between the field sensors 12 and the control unit 16.

The control unit 16 comprises an acquisition unit 18 into which signals from capacitive antennas are input, and a laser instrumentation and control microprocessor 20. The operation of the control unit will become more obvious after reading the description of FIG. 2 below. The control unit 16 also comprises a standby power supply 22 connected to the acquisition unit 18 and the microprocessor 20.

An optical fiber 24 connects the microprocessor 20 in the control unit 16 to one or several laser units 26. FIG. 1 only shows one laser unit. However, several laser units can be connected to control unit 16 to form several ionized channels capable of directing lightning to a number of lightning conductors.

Fiber 24 is used to transfer trigger signals generated by the microprocessor 20, to the laser unit.

The laser unit 26 comprises a laser source 28, for example of the XeCl excimer type. The laser used must be sufficiently powerful to create an ionized channel in air. Thus, a pulsed laser is used capable of emitting high power but short pulses lasting of the order of 20 ns. The minimum required power is a few tens of millijoules but, depending on the envisaged installations, powers of several hundred of millijoules may be required. For example, an experimental installation for protection of a site with a 300 m radius over a height of 200 m will include a 40 mJ laser with a wave length equal to 308 nm.

The laser unit 26 also comprises an optical system 30 for formatting, returning and focusing a laser beam output from source 28. This thus forms a laser beam 32, the diameter of which is of the order of 1 centimeter at the focus point located a few hundred meters away (for example about 100 to 400 meters above the ground).

A lightning conductor 36 connected to the earth is placed in the immediate vicinity (maximum separation a few centimeters) of the laser beam 32 formed by the optical system 30. For example, it may be an ordinary lightning arrester.

In one specific embodiment, the conductor 36 consists of a metal mast with a height exceeding the average height of the buildings or equipment located on the site to be protected. The conductor 36 is extended by an earth connection. For example, the metal mast could be a tubular mast through which the ionized channel is guided.

The lightning conductor is installed or connected to The earth at a determined point, preferably outside the site to be protected.

This ionized channel formed by the laser beam thus forms a channel connected to the earth, through which discharges can be conducted.

When a leader discharge 40 approaches, the laser beam 32 is initiated to create an ionized channel. An upwards precursor 42 then forms starting from the beam 32 and the main lightning strike is guided directly towards the lightning conductor.

Figure 2:
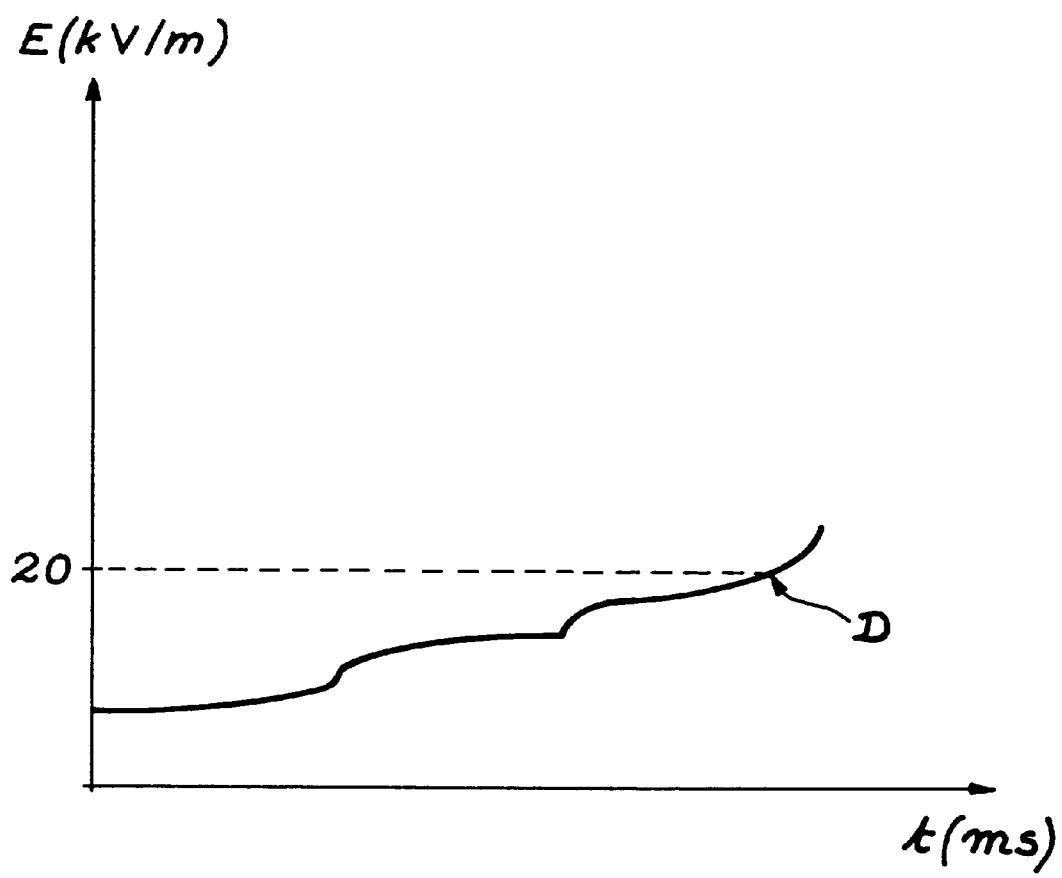
FIG. 2 is a graph showing the variation of the electric field measured on the ground as a function of the leader discharge advance time, at an arbitrary scale.

We will now explain operation of the device with reference to the graph in FIG. 2.

The ordinate of the graph shows the value of the field E (kV/m) measured by capacitive antennas 12, at an arbitrary scale.

The abscissa represents the time in milliseconds starting from the initiation of a leader discharge. The time is also shown on an arbitrary scale.

The time after initiation of the leader discharge is proportional to its distance from the site to be protected. This approach takes place at a speed of the order of $10^5$ m.s$^{-1}$.

It is found that the field E does not increase linearly as the leader discharge gets closer, but rather in a series of jumps.

The microprocessor 20 sets up and analyses the field variation E starting from values recorded in the acquisition unit. When the field variation exceeds a predetermined threshold, for example fixed at 1 kV/m/ms, the microprocessor outputs a laser beam trigger signal to the unit 26. According to one variant, the microprocessor only outputs this signal if the field variation exceeds the predetermined threshold, and also the absolute value of the field exceeds a predetermined threshold value. For example, the threshold of the field may be fixed at 20 kV/m.

This point is shown in FIG. 2 by an arrow marked with reference D.

It may be noted that the entire device, and particularly the acquisition control unit 18, are designed to operate with a resolution with time of the order of 1 microsecond. Signals output from detection antennas also have to be processed quickly due to the approach speed of the leader discharge ($10^5$ m/s).

What is claimed as new and desired to be secured by Letters Patent of the United States is:

1. A device for protecting a site against lightning strikes, comprising:

means for detecting approach of a lightning discharge towards the site;

a lightning conductor; and means for forming an ionized channel in vicinity of the site to direct the lightning discharge towards the lightning conductor, the forming means being controlled by the detecting means, wherein the ionization density of the ionized channel is greater than or equal to an electrification ionization density.

2. The device according to claim 1, wherein the lightning conductor is placed away from the site.

3. The device according to claim 1, wherein the detecting means comprises at least one electric field sensor placed in a region including the site.

4. The device according to any one of claims 1 to 3, wherein the detecting means comprises a signal acquisition and processing control unit that is connected to the electric field sensor to receive the signals for the detection of an electric field on the ground, and to the forming means in order to initiate the formation of the ionized channel.

5. The device according to claim 4, wherein the signal acquisition and processing control unit comprises a control system capable of creating a signal that will trigger means of setting up an ionized channel when a variation in the electric field exceeds a predetermined variation value.

6. The device according to claim 5, wherein the control system outputs the trigger signal when the variation in the field exceeds the predetermined variation value and the electric field exceeds a predetermined electric field value.

7. The device according to claim 6, wherein the predetermined electric field value is about 20 kV/m and the predetermined variation value is about 1 kv/m/ms.

8. The device according to claim 4, wherein the signal acquisition and processing control unit is connected through an optical fiber to the forming means.

9. The device according to claim 1, wherein the forming means comprises a laser.

10. The device according to claim 9, wherein the laser is a pulsed laser with a wave length of between 200 and 400 nm and power of about 1 to 2 MW.

11. The device according to claim 10, wherein the laser has an optical system capable of formatting a beam with a diameter of about one centimeter.

12. A process for protecting a site against lighting strikes, comprising forming an ionized channel in vicinity of the site in order to direct lightning to a lightning conductor, wherein the ionization density of the ionized channel is greater than or equal to an electrification ionization density.

13. A process according to claim 12, wherein the forming step is performed in response to detection of an electric field and a variation of the electric field on ground measured in a region surrounding the site.

14. The process according to any one of claims 12 or 13, wherein the forming step comprises using a laser.

15. A device for protecting a site against lightning strikes, comprising:

means for detecting approach of a lighting discharge towards the site, the detecting means comprising a control means for outputting a trigger signal associated with setting up an ionized channel in response to a variation in an electric field per unit time exceeding a predetermined variation value of about 1 kV/m/ms and to an electric field exceeding a predetermined electric field value of about 20 kv/m, wherein the ionization density of the ionized channel is greater than or equal to an electrification ionization density.

16. A process for protecting a site against lighting strikes, the process comprising:

measuring a variation in an electric field on ground in a region surrounding the site;

forming an ionized channel in response to a variation in an electric field on ground exceeding a predetermined variation value of about 1 kv/m/ms and to an electric field exceeding a predetermined electric field value of about 20 kv/m; and directing the lighting to a lightning conductor via the ionized channel, wherein the ionization density of the ionized channel is greater than or equal to an electrification ionization density.

17. A process for protecting a site against lightning strikes, the process comprising:

measuring a variation in an electric field on ground in a region surrounding the site; and forming an ionized channel in a vicinity of the site based on the measuring step wherein the ionization density of the ionized channel is greater than or equal to an electrification ionization density; and directing the lightning to a lighting conductor via the ionized channel.

* * * * *